Figure 1:
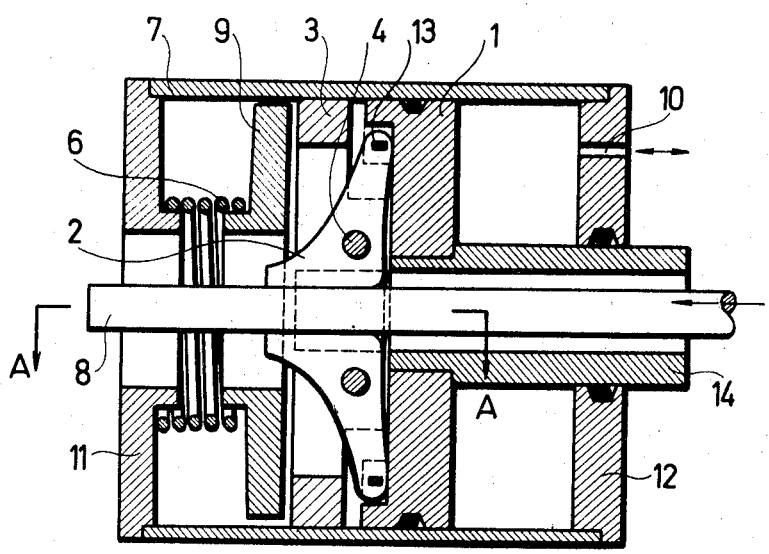

INVENTORS
JÓZSEF NÉMETH
ERNŐ CSOVÁK

BY
ATTORNEYS

United States Patent
Németh et al.

[15] 3,642,186
[45] Feb. 15, 1972

[54] DEVICE FOR CLAMPING AND ADVANCING ELONGATED WORKPIECES

[72] Inventors: József Németh; Ernő Osovák, both of Budapest, Hungary

[73] Assignee: Gepipari Technologiai Intezet, Budapest, Hungary

[22] Filed: Feb. 24, 1970

[21] Appl. No.: 13,618

[30] Foreign Application Priority Data

Mar. 4, 1969 Hungary..................................GE-766

[52] U.S. Cl..........................................................226/164
[51] Int. Cl..........................................................B65h 17/36
[58] Field of Search...........................226/150, 162, 163, 164

[56] References Cited

UNITED STATES PATENTS 3,010,568   11/1961   Annegarn.........................226/150 X
2,598,041   5/1952    Dousa...............................226/164
2,634,974   4/1953    Chuy.................................226/150 X
2,863,659   12/1958   Chuy..................................226/150

Primary Examiner—Allen N. Knowles
Attorney—Young & Thompson

[57] ABSTRACT

For the advancing or feeding motion of bars, wires or the like up to now in most cases two hydraulic devices were used, one for gripping the rod and the other for moving it. According to the invention, to make the apparatus more simple, one single hydraulic cylinder is used for this purpose and according to one embodiment of the invention the piston moved in the hydraulic cylinder actuates at the beginning of its stroke the gripping means and thereafter it shifts this gripping means together with the rod or other workpiece; according to another embodiment the piston is used only for the moving or feeding but the gripping is produced by a series of rings actuated by the same hydraulic fluid which acts on the said piston.

8 Claims, 4 Drawing Figures

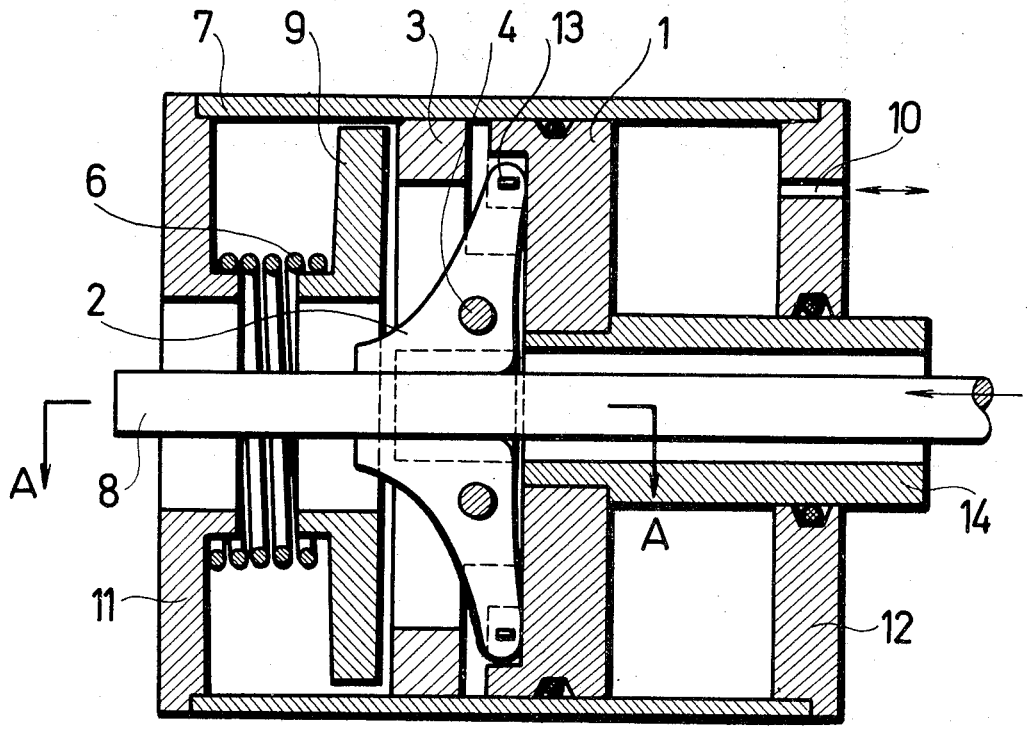

DEVICE FOR CLAMPING AND ADVANCING ELONGATED WORKPIECES

The invention relates to a device for clamping and advancing under pressure elongated workpieces such as rods, bars, wires and strips during continuous production, especially for feeding cutting off, blanking and piercing equipment.

The hitherto known clamping or griping devices do not make possible the grasping of workpieces along a great surface, that is to say with a large force and still with a low specific pressure. The invention secures the solution of this problem with simple means and maintaining at the same time quick operation.

The present invention relates primarily to a clamping device for bars, the essential character of which consists in a series of segmented rings enclosing the workpiece (bar, wire etc.), the rings being encircled by an elastic cylindrical membrane, which membrane is pressing under the action of a compression medium the segmented rings onto the workpiece. If the action of the compression medium is interrupted, the clamping (gripping) action ceases as well. This method of clamping has the great advantage against the hitherto known clamping constructions that the gripping is distributed to several ring segments which can be moved independently from each other and so the total compressing force is acting on a great surface even in that case if there are distortions on the surface of the workpiece due to the processing or some other faults. The structure and the operation of the device is in spite of the great number of the rings very simple and the efficiency is good, because the rings are actuated by a common, elastic cylindrical membrane.

The currently applied feeding or advancing systems include two separate hydraulic or pneumatic cylinders, which are actuated at least by two pneumatic or hydraulic valves. The expenditures connected with the assembling and the control of such cylinders and the valves increase considerably the costs of such equipments. The equipments set up from two cylinders are not only intricate, but are inherited with the deficiency that after each rod or workpiece there remains some trimmings, or the end of the workpiece must be processed by manual feeding.

The invention aims the elimination of the disadvantages of the said equipments with similar destination, by establishing a method, according to which the clamping and advancing of the starting material is effected by a special piston system, located within one single cylinder; these equipments can be set up according to the requirements, have small dimensions and at the same time great output, are according to the setup of single or double action, and besides of this are able to transfer very great axial forces through the help of any suitable high-pressure medium used for energy transfer. With the help of this equipment it is possible to produce axial stresses of such an order of magnitude in the advanced material (rod, bar or the like), which is sufficient to effect flow of the material (especially in the vicinity of the end of the rod).

The abutting of the equipment can be effected rigidly or elastically. The feeding length can be adjusted easily and quickly, besides of this the manufacturing costs of the equipment are low when compared with the costs of other equipments with similar destination.

A more detailed exposition of the method and device according to the invention is described in connection with the embodiments given by way of example and shown in the enclosed figures.

Figure 2:
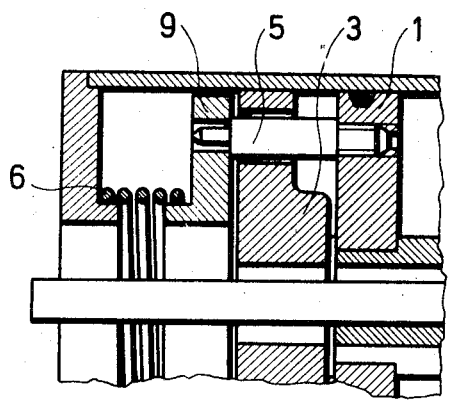

FIGS. 1 and 2 are showing a possible embodiment of the device, suitable to carry out the method according to the invention. FIG. 1 shows a longitudinal section of the device, whereas FIG. 2 illustrates another section along the plane "A" of FIG. 1 in clamping position.

The clamping-advancing device is situated in a cylinder 7 which is closed on both ends by heads 11 and 12. The gripping of the workpiece 8 is effected by bellcrank levers 2, which are connected through pins 4 acting as hinges to a slotted disc 3, which is sliding in the cylinder 7 with tight running fit. The levers 2 are connected with the actuating piston 1 through a tilting pin 13. The workpiece 8 and the actuating space of the cylinder are separated by a sleeve 14, which is tightly fitted on his left end to the piston 1.

The device is returned to the starting piston by a spring 6. The piston 1 is actuated by the spring 6 through a spring retained 9 by the help of shouldered pins 5.

The operation of the device is as follows: through the effect of the actuating medium which is let in through a slot 10 of the head 12 seen in FIG. 1, the piston 1 is moved in the cylinder 7 together with the sleeve 14 to the left and since there arises a relatively great friction force between the slotted disc 3 and the cylinder 7, the effect turns the bellcrank levers 2 around the pins 4. The proportion of the arms of the levers 2 is selected in such a way that one arm of each lever is forced as a consequence of the turning to the workpiece 8 and are gripping the same. Simultaneously with the clamping of the workpiece 8 the shouldered pin 5 which is screwed to the piston 1 is also moving to the left, acting with its shoulder on the spring retainer 9 and compressing the spring 6.

During the first phase of the operation the workpiece 8 due to the gripping of the clamping arms and the pressure of the spring 6, as well as the travelling parts 1, 2, 3 and 9 within the cylinder 7 are forming a unique system moving together.

If further actuating medium is streaming in, the travelling parts are moved further to the left compressing at the same time the spring 6 and taking along the workpiece 8. This motion is continued until the left end of the workpiece 8 is abutting (on a not shown stop).

After the cessation of the pressure of the actuating medium the spring 6 is moving the spring retainer 9 and the actuation piston 1 to the right, with the help of the shouldered pins 5. As a consequence of this movement the tilting pins 13 are turning the clamping arms 2 and thereby releasing the gripping of the workpiece 8. Due to the fact that at first the shouldered pin 5 is setting in movement the piston 1 and the other parts while the disc 3 is still stationary, the workpiece is released and the other parts of the device are travelling only thereafter. This secures that during the resetting of the device the workpiece is not moved. During resetting the spring retained 9 is moved by the spring 6 against the slotted disc 3 and the travelling parts 1, 2, 3 and 9 are returned to their original position to the right.

Figure 4:
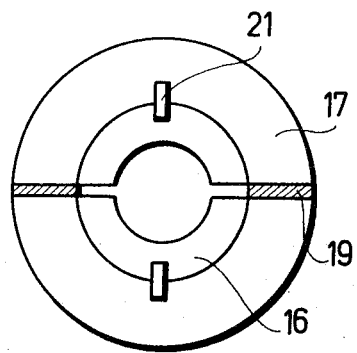
Figure 3:
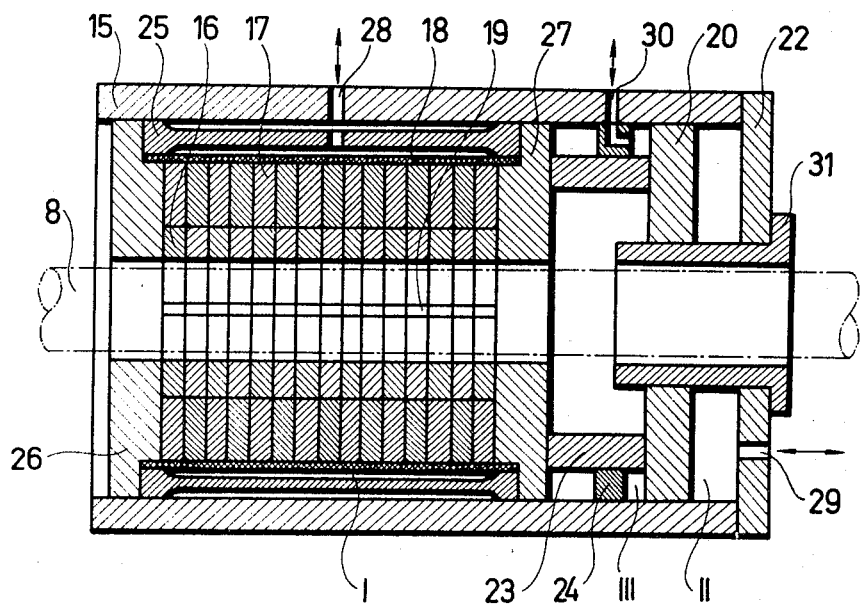

FIGS. 3 and 4 show the longitudinal and the cross section respectively of another possible form of the device, suitable to carry out the method according to the invention. This embodiment can be applied especially well to cutting off and cold-extrusion machines with smaller or greater capacity. It is suitable to transfer or hold even in the case of rods, bar and profiles with greater cross section such axial forces, which are setting up stresses in the bars surpassing the yield strength.

From the above explanation it is clear that the gripping of the workpiece and its feeding too is effected by one single piston, so that according to the invention only one cylinder 7 is necessary.

The clamping-advancing device seen in FIGS. 3 and 4 in longitudinal and in cross section is situated in a fixed cylinder 15 and is divided into three actuating spaces.

The radial gripping space I is delimited by an elastic sealing sleeve 18 and a distance ring 25. The segmented power transmission rings 17 and clamping rings 16 are situated within the elastic sealing sleeve 18. The clamping rings 16 and the power transmission rings 17 are manufactured in two or more segments. In FIG. 4 a form of these rings can be seen by way of example. In order to secure the relative position of the divisions in the same axial plane, key 21 is inhibiting the rotation of the rings relative to each other, while an elastic insert 19 is moving off the two half-rings from each other. The gripping elements mentioned above are delimited on both sides by heads 26 and 27 screwed to the distance ring 25.

The advancing and axial power transferring space II is delimited by the piston 20 within the cylinder 15, the head 22 and the sleeve 31, while a retracting space III is delimited by the ring 24 fitted to the cylinder 15, the piston 20 and the power-transferring ring 23 screwed to the head 27 and the piston 20.

The operation of the device is as follows: high-pressure oil is led through the admitting ports 28 and 29 simultaneously to the actuating spaces I and II. The oil led through the admitting port 28 is acting on the elastic sealing sleeve 18, compressing the elastic insert 19 and moving the power transmission rings 17 and clamping rings 16 towards each other, gripping hereby the workpiece 8.

Following this, the oil led through the admitting port 29 is acting on the right surface of piston 20 and hereby forcing the same to the left, together with the power-transferring ring 23 as well as the connected clamping system consisting of the parts 27, 16, 17, 18, 25 and 26, with the already gripped workpiece 8. This leftward movement is continued until the left end of workpiece 8 is abutting. This state conforms to the working position of the device.

After the time period necessary for the work cycle has passed, the overpressure is ceased in the working spaces I and II, due to which the clamping rings 16 are releasing under the action of the elastic insert 19 the workpiece 8. After having annulled the overpressure in the working spaces I and II, oil is led through the admitting port 30 into the retracting space III. The inflowing oil is acting on the left ring surface of the piston 20 and hereby forcing the same to the right, together with the power-transferring ring 23 as well as the clamping system consisting of the parts 27, 16, 17, 18, 25 and 26, up to the right-hand terminal position.

Due to the elasticity of the membrane each clamping ring segment is effecting during gripping the required clamping force, even in that case if there are irregularities or defects on the surface of the workpiece.

We claim:

1. In a fluid pressure device for clamping and advancing an elongated workpiece, comprising a stationary cylinder, a piston in the cylinder subjected to the action of a fluid pressure medium, said piston having an interior space through which the workpiece advances and which is isolated from said fluid pressure medium, a plurality of bellcrank levers engageable with the workpiece on the side of the piston opposite said medium, one arm of each said lever contacting said piston and the other arm contacting the workpiece, a slotted disc in which the rotating pivots of the levers are disposed, said disc being disposed in the cylinder; the improvement comprising a plurality of shouldered pins (5) with a spring retainer (9) urged by a spring (6) in a direction opposite that in which the fluid pressure medium urges the piston so that the pins attached to the piston are supported on the spring retainer by their shoulders and extend through said slotted disc (3).

2. In a fluid pressure device for clamping and advancing an elongated workpiece a stationary cylinder, a series of segmented rings encircling and clamping the workpiece, an elastic cylindrical membrane enclosing the series of segmented rings and disposed in a ringlike fluid pressure space in such a way that said membrane delimits said space on one side, said stationary cylinder delimiting said space on the opposite side, said space communicating with a source of fluid pressure medium; the improvement comprising a further series of segmented power-transferring rings (17) outside the first-mentioned series (16) clamping the workpiece, elastic inserts (19) in the division plane of some of said rings, and keys (21) contacting the rings and inhibiting their turning.

3. A device as claimed in claim 2, there being three spaces in said cylinder (15), one of said spaces (I) being delimited by said cylindrical membrane (18), the other two (II) and (III) of said spaces being disposed on opposite sides of a piston (20) that moves the workpiece and the clamping rings.

4. A device as claimed in claim 3, and two heads (26 and 27) secured to a distance ring (25) disposed within said one space (I), said heads confining between them said rings and being slidably disposed in said stationary cylinder (15), one of the heads (27) being secured to said piston (20).

5. In a fluid pressure device for clamping and advancing an elongated workpiece, a piston (1) subjected to the action of the actuating medium and situated in a fluid pressure cylinder (7), at least two bellcrank levers (2) forced against the workpiece, one arm of said levers contacting said piston and the other arm of the same contacting the workpiece, the rotating pivots (4) of these levers being arranged in a slotted disc (3) fitted in the cylinder, the actuating piston being connected through at least two shouldered pins (5) with a spring retainer (9) working under the action of a spring in such a way that the pins (5) attached to the piston (1) are supported on the spring retainer (9) by their shoulders and are led through the slotted disc (3) holding the bellcrank levers (2).

6. In a fluid pressure device for clamping and advancing an elongated workpiece, a series of segmented rings (16) encircling and clamping the workpiece and an elastic cylindrical membrane (18) enclosing said series of segmented rings, which is situated in a ringlike fluid pressure space (I) in such a way that it delimits this space on one side, whereas the space is delimited on the other side by a stationary cylinder (25) and the said space communicates with a source of fluid pressure, a further series of segmented power-transferring rings (17) outside the series of segmented rings (16) clamping the workpiece, elastic inserts (19) in the division plane of the power-transferring rings, and keys (21) contacting said rings and inhibiting their turning.

7. A device according to claim 6, characterized by three spaces in the stationary pneumatic or hydraulic cylinder (15), from which one (I) is delimited by said cylindrical membrane (18), whereas the other two (II and III) are situated on both sides of a piston (20) which moves the workpiece and the clamping device.

8. A device according to claim 7, characterized by two heads (26 and 27) attached to the distance ring (25) situated within the fluid pressure space (I) of the series of segmented rings (16), said heads confining said rings between them, these heads being slidably disposed in the stationary cylinder (15), one of the heads (27) being attached to the actuating piston (20).

* * * * *